United States Patent [19]

Cooper

[11] Patent Number: 4,962,938

[45] Date of Patent: Oct. 16, 1990

[54] RUPTURABLE CHAMBER GASKET

[76] Inventor: Robert T. Cooper, 760 Eucaluptus Ave. #6, Vista, Calif. 92083

[21] Appl. No.: 438,796

[22] Filed: Nov. 20, 1989

[51] Int. Cl.$^5$ ............................................. F16J 15/02
[52] U.S. Cl. ................................... 277/201; 137/68.1; 206/634; 220/89 A; 277/72 FM; 277/226; 277/DIG. 10
[58] Field of Search ............... 277/201, 202, DIG. 10, 277/166, 235 B, 135, 70, 72 FM, 226; 285/910; 220/89 A; 137/68.1; 206/632, 634

[56] References Cited

U.S. PATENT DOCUMENTS

| | | | |
|---|---|---|---|
| 2,055,471 | 12/1933 | Balfe | 154/45.5 |
| 2,729,483 | 1/1956 | Victor | 288/66 |
| 3,061,895 | 11/1962 | Kleinhans | 277/201 |
| 3,391,242 | 7/1968 | Sudges | 174/15 |
| 3,740,062 | 6/1973 | Robins | 277/235 |
| 3,767,211 | 10/1973 | Amphlett | 277/1 |

*Primary Examiner*—Allen N. Shoap
*Assistant Examiner*—Daniel G. DePumpo
*Attorney, Agent, or Firm*—Andsel Group

[57] ABSTRACT

A gasket with a first layer and a second layer of gasket material joined to the first layer with a sealant chamber formed between the two layers is provided. The first and second layers have a plurality of first passageways that are sealed with a rupturable membrane to protect the sealant contained within the sealant chamber. The gasket has at least one second passageway to accommodate flow ways and fastener devices associated with two the opposing surfaces to be sealed with the aid of the gasket described herein. The gasket has a circumferential compressible barrier means to provide a barrier to the flow of the sealant into the second passageways.

6 Claims, 1 Drawing Sheet

RUPTURABLE CHAMBER GASKET

BACKGROUND OF THE INVENTION

1. Field of the Invention

This invention relates to gaskets. This gasket has two gasket layers with a sealant chamber formed between them. The two layers have passageways through which a sealant can flow. The gasket can be used to seal two opposing surfaces.

2. Description of the Related Art

Gaskets are a common means used when mating two opposing, usually metal, surfaces together to form a leak-proof seal between the opposing surfaces. Gaskets are especially common to engines, both internal combustion and steam, and to pumps to prevent leakage of pressure, lubricants and cooling fluids. There are countless other applications for gaskets in many different situations.

Some of the problems with gaskets and their application is the time required to properly place the gasket between the two opposing surfaces. The two opposing surfaces usually require a thorough cleaning, need to be relatively smooth and need to be free of debris. Formally the surface was frequently painted with an adhesive bonding agent to assist the sealing of the two opposing surfaces with the gasket. Often, once the two opposing surfaces and the gasket were coated with the adhesive bonding agent, the user had to be very careful that dirt, grease or other debris did not attach itself to the surfaces coated with the adhesive. Such foreign matter would often prevent a proper seal. The user often did not become aware of the problem until the equipment having the surfaces to be sealed was once again reassembled.

The disassembly, cleaning, placing of the gasket and reassembly can be a very time consuming and costly procedure. Especially if one has to redo the process after a leak in the gasketed surfaces is discovered.

U.S. Pat. No. 2,055,471 to G. T. Balfe describes a laminated material with an exterior coating of a bonding material to protect the gasket. U.S. Pat. No. 2,729,483 issued to J. B. Victor on Jan. 3, 1956 describes a gasket with an asbestos center. The asbestos protrudes through small holes to effect a seal. U.S. Pat. No. 3,391,242 issued to R. A. Sudges on July 2, 1968 shows a wafered transistor base with holes to allow a silicone insulation material to penetrate the base and insulate the transistor base from the surface upon which it is placed U.S. Pat. No. 3,740,062 issued to Charles I. Robins on June 19, 1973 describes a gasket with its surface coated with a binding material containing a plurality of capsules containing a sealant. The capsule coating is applied to the gasket surface by a method of rolling. U.S. Pat. No. 3,767,211 to Philip Harold Amphlett on Oct. 23, 1973 shows another gasket whose surface is coated with a plurality of capsules of sealant.

The present invention offers the user an easy to use, self-contained gasket wherein the sealant is protected from dirt and other foreign material. The sealant is not exposed until the two opposing surfaces are compressed. The membrane sealing the passageways is then ruptured and the sealant coats the opposing surfaces and the surfaces of the gasket.

SUMMARY OF THE INVENTION

The present invention is a gasket for sealing a pair of opposing surfaces. The gasket has a first layer of gasket material, a second layer of gasket material and a sealant chamber formed between the first and second layer. There are a plurality of first passageways through the first and second layers communicating with the sealant chamber. A rupturable membrane seals the first passageways. There is a sealant within the sealant chamber. The sealant flows from the sealant chamber, through the first passageways, rupturing the membranes and coats the opposing surfaces and a first surface of the first layer and a second surface of the second layer when the first and second layers are pressed together between the two opposing surfaces deforming the sealant chamber.

The gasket may have the number of first passageways in the first and second layers limited to control the distribution of the sealant and to maintain an approximate uniform flexibility throughout the first and second layers of gasket material. The number of first passageways in the first and second layers of gasket material may be limited to approximately 25 passageways per square inch. The sealant in the sealant chamber may be a lubricant to reduce friction between the two opposing surfaces. The first and second layers of gasket material and the sealant chamber may have a plurality of second passageways corresponding to at least one third passageway, at least one stud and at least one bolt, singularly, and to any combination thereof located in the two opposing surfaces. There may be a circumferential compressible barrier means forming a wall adjacent to the circumference of the second passageways to provide a barrier to the flow of the sealant material from the sealant chamber into the second passageways.

Therefore, it is an object of this invention to provide a gasket that has sealant contained in a sealant chamber with passageways to the surface of the gasket which are sealed to protect the sealant.

It is another object of this invention to provide a gasket that allows the user to place a gasket between two opposing surfaces, to prevent fluids and gases from leaking from between those two opposing surfaces, that reduces the fouling of the sealant with dirt or foreign particles because of the tacky nature of most sealants that are coated on the surfaces prior to the application of the gasket between the two opposing surfaces.

DESCRIPTION OF THE PREFERRED EMBODIMENT

Figure 1:
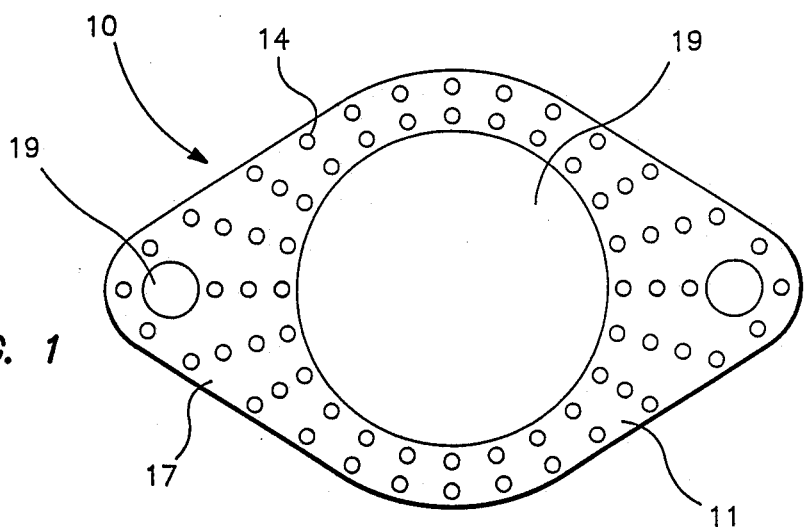
FIG. 1 is a longitudinal view of the gasket showing the first and second passageways.
Figure 2:
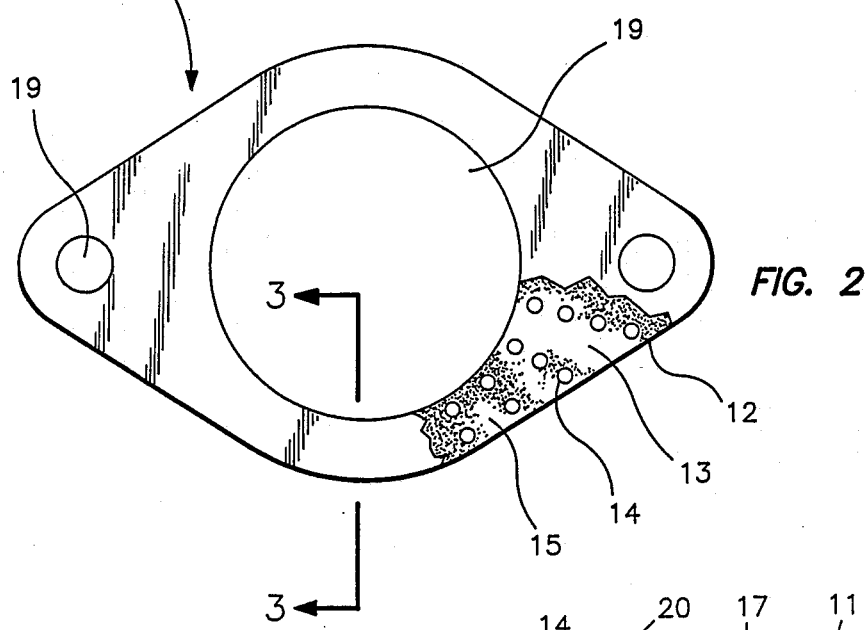
FIG. 2 is a fragmented longitudinal view of the gasket showing the sealant in the sealant chamber and the first passageways in one of the layers.
Figure 3:
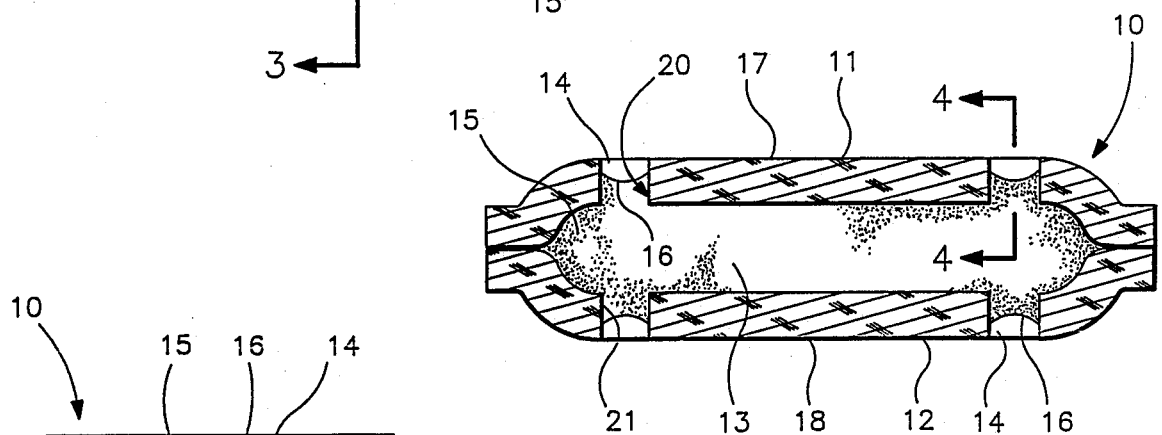
FIG. 3 is a cross sectional view along lines 3—3 of FIG. 2 showing the first passageways sealed by the rupturable membranes and the sealant chamber.
Figure 4:
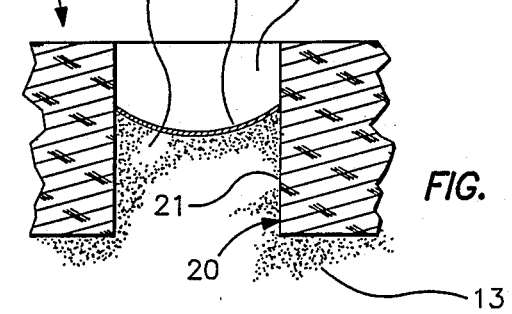
FIG. 4 is a partial cross sectional view along lines 4—4 of FIG. 3 showing an enlarged view of a first passageway and a rupturable membrane sealing the sealant in the sealing chamber.

Referring to FIGS. 1,2,3 and 4, a gasket 10 for sealing a pair of opposing surfaces (not shown) is shown. The gasket material may be of any suitable gasket material available in the marketplace. A first layer 11 of gasket material, a second layer 12 of gasket material joined to the first layer 11, by sealing or forming the edges or any other appropriate method or means available, and a sealant chamber 13 formed between the first and second layer. The sealant chamber 13 is shown in FIG. 3. There are a plurality of first passageways 14 through the first layer 11 and the second layer 12 communicating with the sealant chamber 13 and the first surface 17 of the first layer 11 and the second surface 18 of the second layer 12. There is a sealant 15 within the sealant chamber 13.

The number of first passageways in the first and second layers, 11 and 12 respectively, may be limited to approximately 25 passageways per square inch to control the distribution of the sealant 15 and to maintain an approximate uniform flexibility of the gasket material. Other numbers of first passageways per square inch will provide differing dispersion of the sealant and flexibility of the gasket material and may prove advantageous in certain situations.

In operation, the sealant 15 flows from the sealant chamber 13, through the first passageways 14, rupturing the membranes 16 and allowing the sealant 15 to coat the opposing surfaces and a first surface 17 of the first layer 11 and a second surface 18 of the second layer 12 of the gasket 10 when the first and second layers are pressed together between the two opposing surfaces (not shown). The sealant chamber is deformed and the area of the sealant chamber is reduced. This forces the sealant out of the chamber 13 into the first passageways 14 and out into the area between the two opposing surfaces. As the pressure placed on the two opposing surfaces and the gasket 10 increases, the sealant is forced out along the opposing surfaces and along the first and second surfaces of the gasket 10 coating the surfaces involved with the sealant 15.

There is a plurality of second passageways 19 that correspond to a third passageway (not shown) of the opposing surface. There may be one or more of these third passageways depending on the design and purpose of the two opposing surfaces. The second passageways 19 also correspond to the studs and/or bolts and other devices (not shown) used or found on the two opposing surfaces. These studs and bolts (not shown) are often used to tighten and compress the gasket 10 and the two opposing surfaces together. The third passageways often allow the passage of lubricants and cooling fluids to pass between the two opposing surfaces. The second passageways 19 allow these same fluids to pass through the gasket 10. There is a circumferential barrier means 20 forming a wall 21 adjacent to the circumference of the second passageways 19 to provide a barrier to the flow of the sealant 15 from the sealant chamber 13 into the second passageways 19.

There are times when two opposing surfaces are assembled, such as when the male end of a pipe and the female end of another pipe are assembled together, that an easily placed lubricant is needed. A gasket such as described herein could have the sealant chamber filled with a lubricant which would be forced out upon the opposing surfaces of the pipes.

The foregoing descriptions and drawings of the invention are explanatory and illustrative only, and various changes in shapes, sizes and arrangement of parts as well as certain details of the illustrated construction may be made within the scope of the appended claims without departing from the true spirit of the invention.

I claim:

1. A gasket for sealing a pair of opposing surfaces comprising:
  a. a first layer of gasket material;
  b. a second layer of gasket material joined to the first layer and a sealant chamber formed between the first and second layer;
  c. a plurality of first passageways through the first and second layers communicating with the sealant chamber;
  d. a rupturable membrane sealing the first passageways;
  e. a sealant within the sealant chamber; and
  f. the sealant flowing from the sealant chamber, through the first passageways, rupturing the membranes and coating the opposing surfaces and a first surface of the first layer and a second surface of the second layer when the first and second layers are pressed together between the two opposing surfaces deforming the sealant chamber.

2. A gasket as defined in claim 1 wherein the number of first passageways in the first and second layers are limited to control the distribution of the sealant and to maintain an approximate uniform flexibility throughout the first and second layers of gasket material.

3. A gasket as defined in claim 1 wherein the number of first passageways through the first and second layers are approximately 25 passageways per square inch.

4. A gasket as defined in claim 1 wherein the sealant is a lubricant to reduce friction between the two opposing surfaces.

5. A gasket as defined in claim 1 wherein the first and second layers of gasket material and the sealant chamber comprise:
  a. a plurality of second passageways corresponding to at least one third passageway, at least one stud and at least one bolt, singularly, and to any combination thereof located in the two opposing surfaces; and
  b. a circumferential compressible barrier means forming a wall adjacent to a circumference of the second passageways to provide a barrier to the flow of the sealant from the sealant chamber into the second passageways.

6. A gasket for sealing a pair of opposing surfaces comprising:
  a. a first layer of gasket material;
  b. a second layer of gasket material joined to the first layer and a sealant chamber formed between the first and second layer;
  c. a plurality of first passageways through the first and second layers communicating with the sealant chamber;
  e. a rupturable membrane sealing the first passageways;
  f. a sealant within the sealant chamber;
  d. the number of first passageways in the first and second layers being limited to approximately 25 passageways per square inch to control the distribution of the sealant and to maintain a approximate uniform flexibility throughout the first and second layers of gasket material;
  g. the sealant flowing from the sealant chamber, through the first passageways, rupturing the membranes and coating the opposing surfaces and a first surface of the first layer and a second surface of the second layer when the first and second layers are pressed together between the two opposing surfaces deforming the sealant chamber;
  h. a plurality of second passageways corresponding to at least one third passageway, at least one stud and at least one bolt, singularly, and to any combination thereof located in the two opposing surfaces; and
  i. a circumferential compressible barrier means forming a wall adjacent to a circumference of the second passageways to provide a barrier to the flow of the sealant material from the sealant chamber into the second passageways.

* * * * *